Patented June 10, 1947

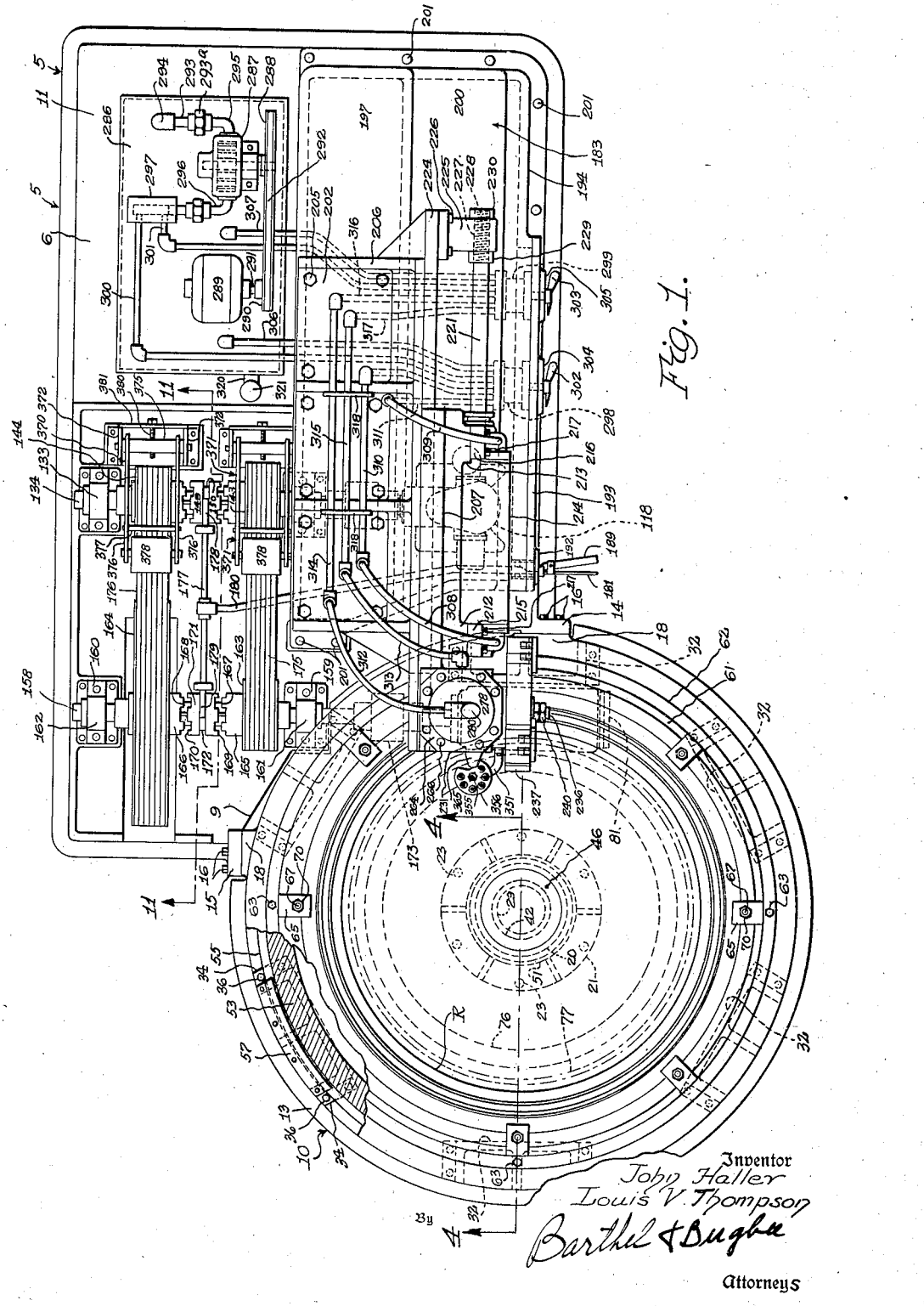

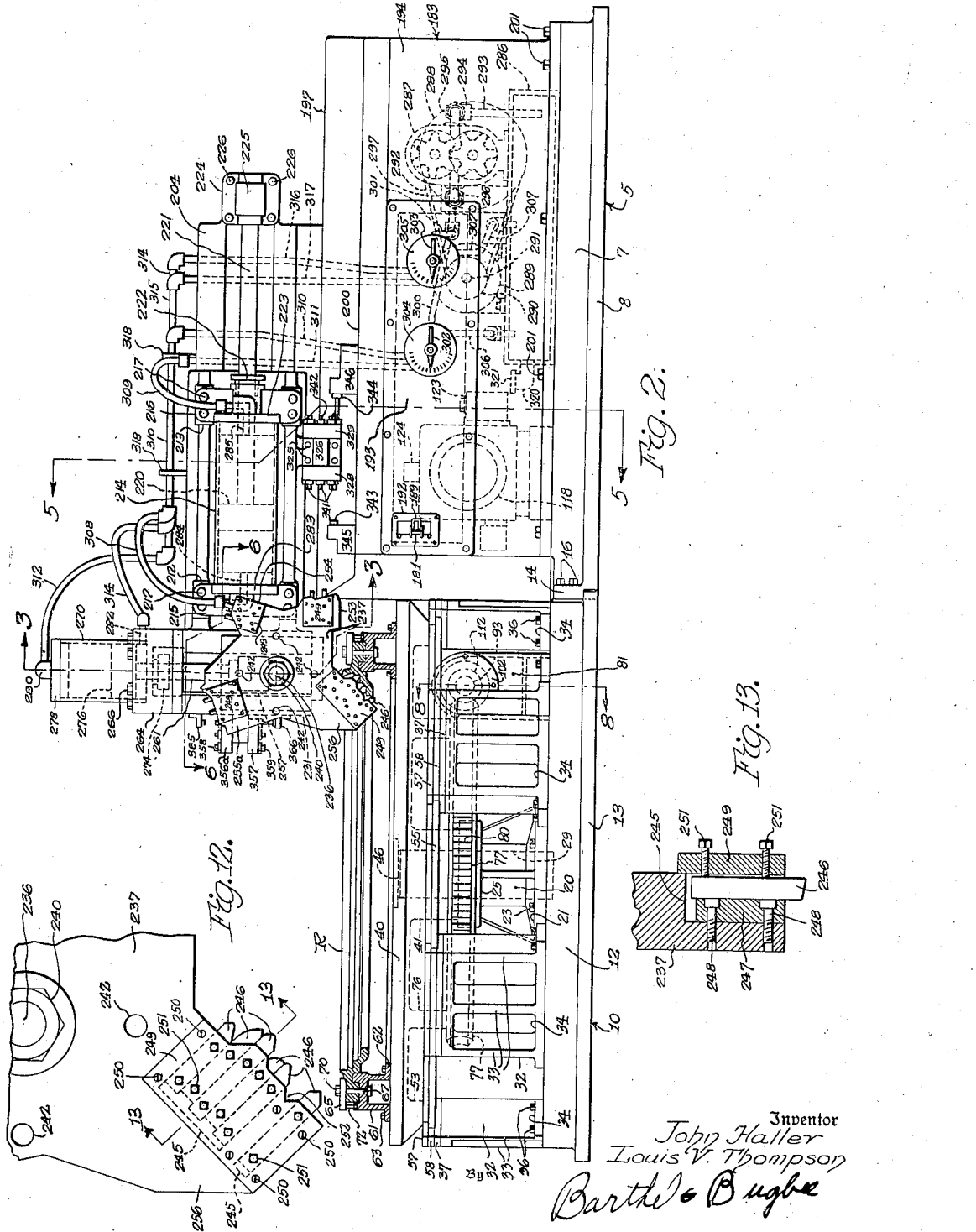

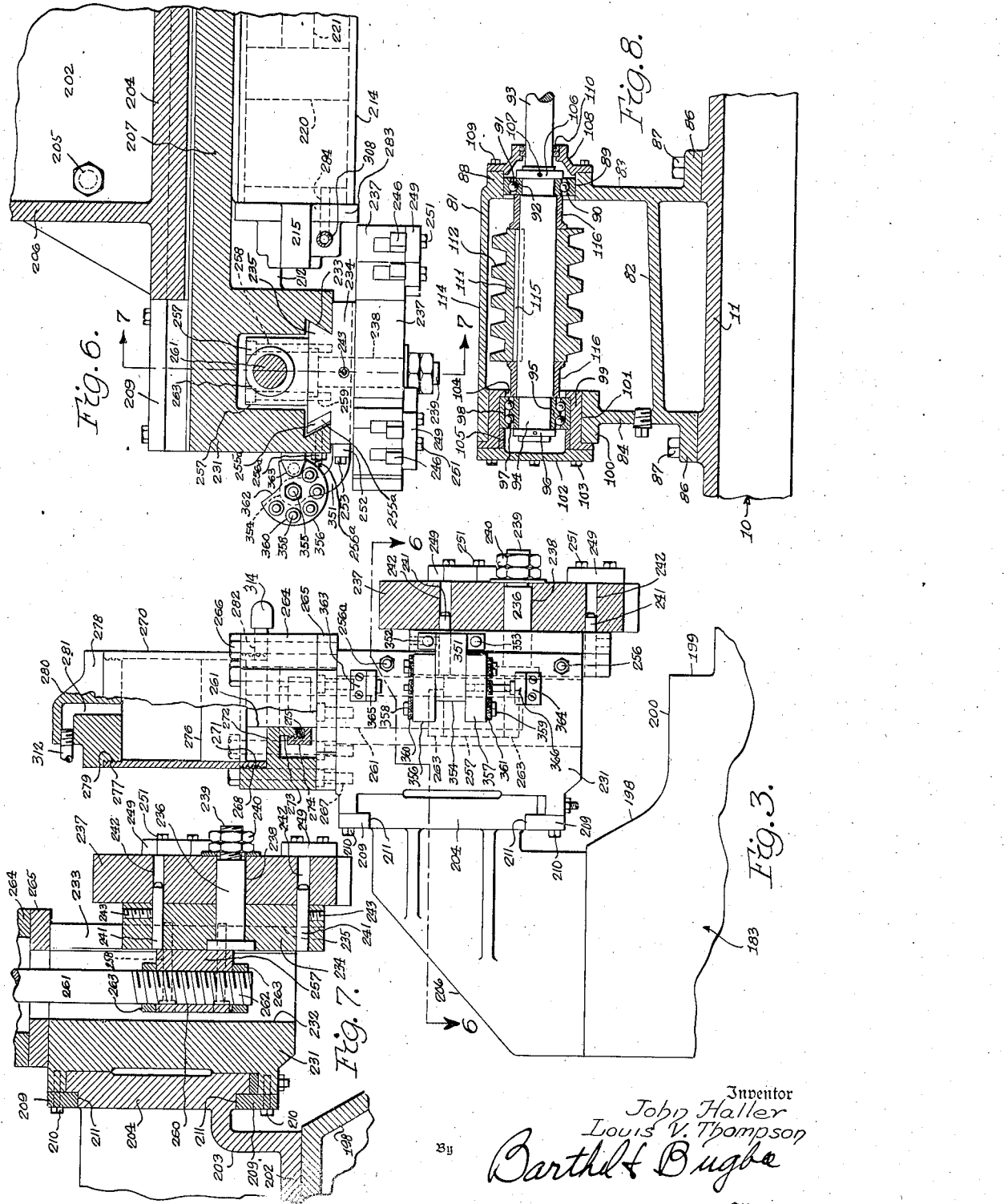

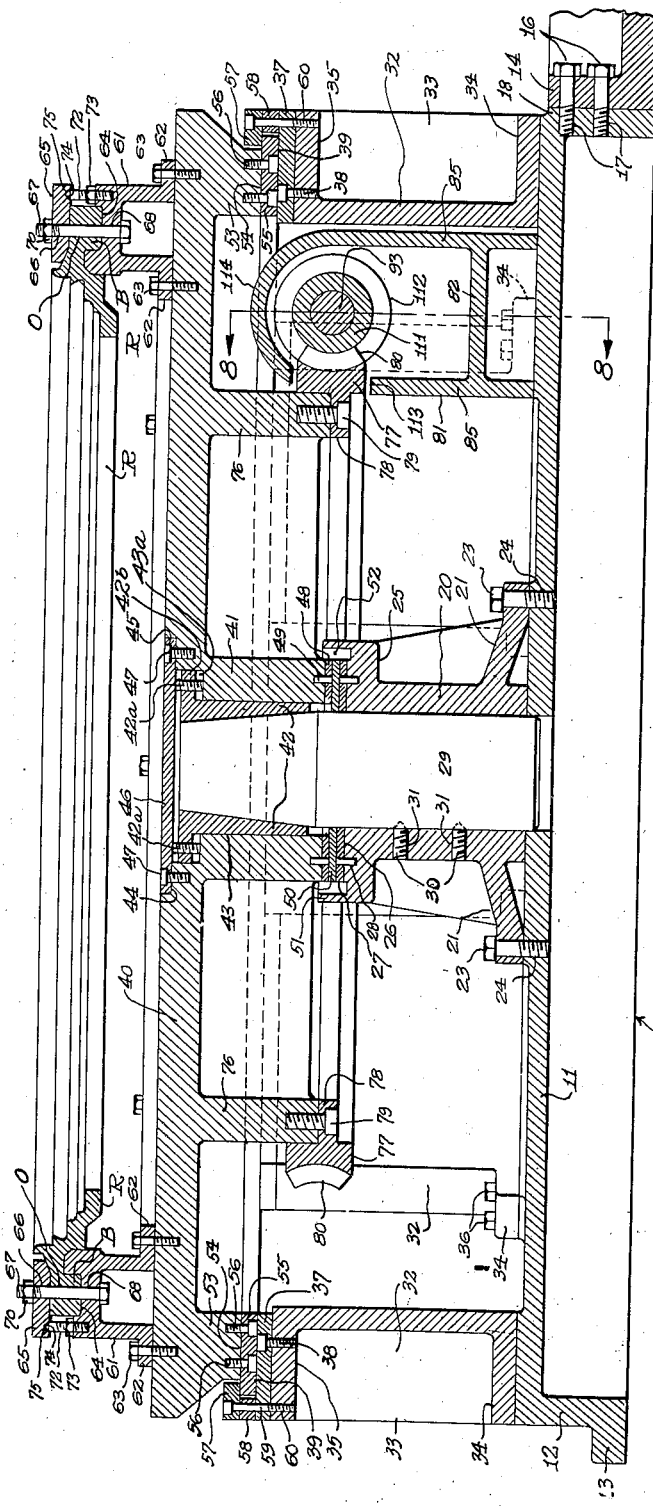

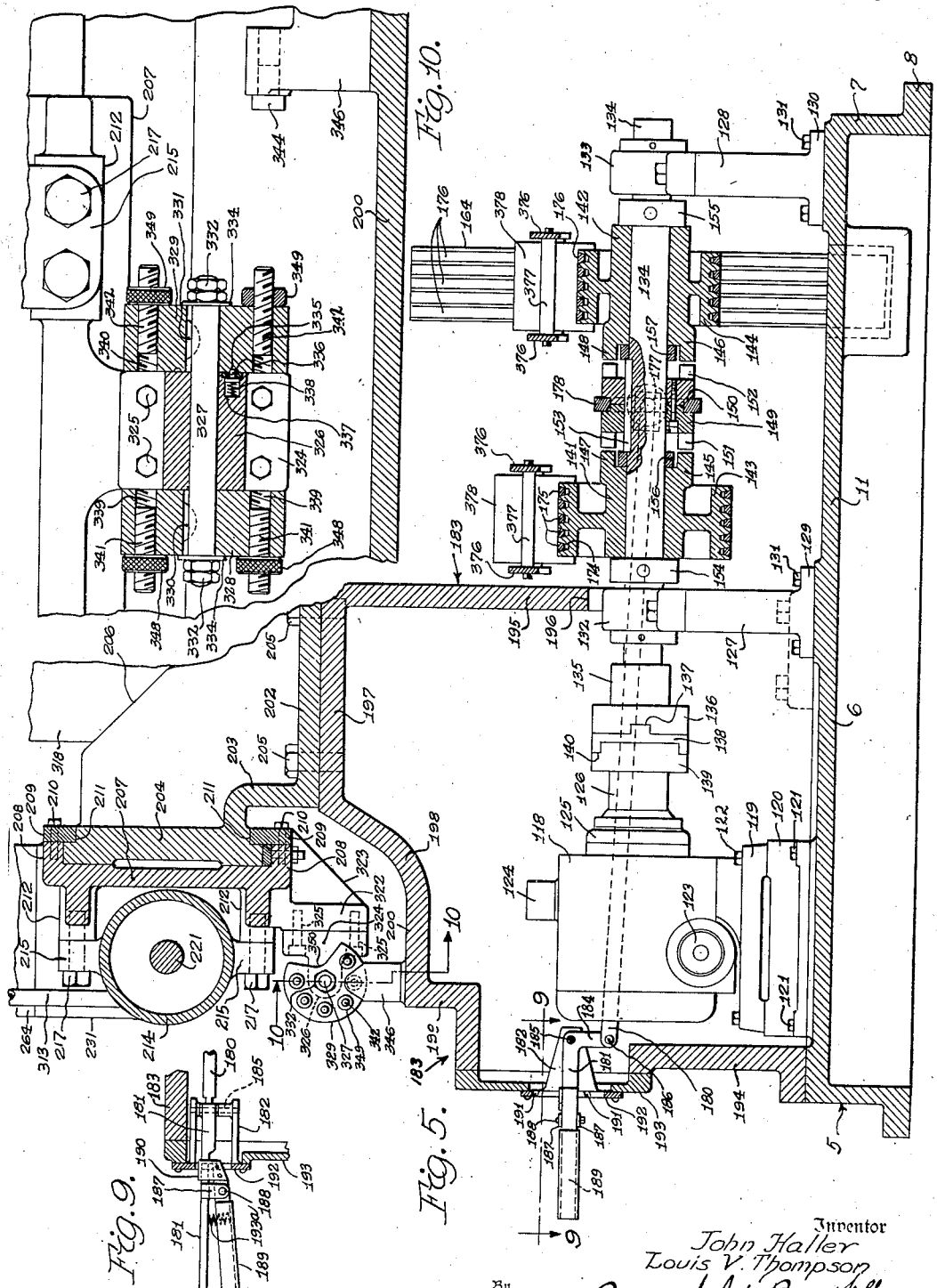

2,422,095

UNITED STATES PATENT OFFICE 2,422,095

VERTICAL CUTTING MACHINE

John Haller, Northville, and Louis V. Thompson, Detroit, Mich., assignors to Steel Tank Corporation, Detroit, Mich., a corporation of Michigan Application September 2, 1942, Serial No. 457,000

8 Claims. (Cl. 29—29)

The present invention relates to cutting and shaping machines and more particularly to a machine for operating on circular work pieces.

The primary purpose of the invention is to provide a machine having a rotary work holder adapted to rotate a circular piece of work so that a turret head cutting element may be presented to the work to cut annular contours therein of true circular shape and size.

Another object of the invention is to provide a machine having a rotary work holder and a turret cutter head arranged so that the turret cutter head may be moved vertically or horizontally with respect to the work so that various annular shaped and configurations may be formed in the circular faces of the work piece with a minimum amount of labor and without requiring numerous calculations and measurements.

Another object of the invention is to provide a machine of the above mentioned character having means for gauging and limiting the movement of the turret head cutter toward and away from the circular work piece to minimize the time and labor for adjustments and to increase the accuracy of such adjustments.

Another object of the invention is to provide a cutting machine of the above mentioned character in which the work piece is rotated on a rotary work table and the cutting tool is presented thereto in direct alinement with the radius of the work holder whereby the cutting tool may be moved vertically or horizontally with respect to the work to produce cuts therein of various depths.

Another object of the invention is to provide a cutting machine particularly applicable to circular work pieces in which a rotary table is adapted to support the work in such a manner as to insure a true cut and prevent wobble of the work holder and work piece.

Another object of the invention is to provide a cutting machine of the above mentioned character in which the turret cutter head is moved toward and away from the work in vertical and horizontal directions by means of fluid pressure to facilitate quick and positive action of the cutter head and its movement into the path of the work.

Another object of the invention is to provide a cutting machine of the above mentioned character having a rotary work table which is driven by a suitable motor between which is interposed change speed gearing to enable the table to be driven at various speeds relative to the cutting tool whereby work pieces of various circular sizes may be operated upon without effecting the accuracy of the finished cut.

Another object of the invention is to provide manual control means for operating the fluid pressure turret head feeding means and manual control means for the change speed gearing so that both manual control means may be manipulated at a common point, thereby obviating the necessity of providing two or more operators thereby resulting in a reduction of labor and likewise, a reduction in time.

Another object of the invention is to provide a cutting machine of the above mentioned type in which the fluid pressure feed means for the turret cutting head is supplied from a pump connected with the feed means and the manual controls therefor so that the pressure may be selectively applied to opposite ends of the feed cylinders to either move the turret head toward the work or away therefrom.

Other objects and advantages of the invention will become apparent during the course of the following description of the accompanying drawings, wherein Figure 1 is a top elevation of the cutting machine illustrating the complete assembly and showing the manner in which the rotary work table is arranged relative to the turret head cutting tool.

Figure 2 is a front elevational view of the cutting machine illustrating in detail the arrangement of the several instrumentalities and showing the turret head cutter presented to the work on the rotary work supporting table.

Figure 3 is a vertical cross sectional view taken on lines 3—3 of Figure 2 looking in the direction of the arrows illustrating in detail the turret cutter head and the manner in which it is supported.

Figure 4 is a longitudinal cross sectional view taken on line 4—4 of Figure 1 looking in the direction of the arrows illustrating the manner of supporting the work table and the gearing for rotating the same.

Figure 5 is a vertical cross sectional view taken on lines 5—5 of Figure 2 looking in the direction of the arrows further illustrating the turret head supporting slide and the work table change speed gearing.

Figure 6 is a horizontal cross sectional view taken on lines 6—6 of Figures 3 looking in the direction of the arrows illustrating the turret head cutter slide and the fluid pressure feeding means therefor.

Figure 7 is an enlarged cross sectional view taken on lines 7—7 of Figure 6 looking in the direction of the arrows showing the connection between vertical fluid pressure feed means and the rotary turret cutter head.

Figure 8 is a vertical cross sectional view taken on line 8—8 of Figure 4 looking in the direction of the arrows illustrating in detail the worm drive for the rotary work supporting table and showing the casing for the worm gearing.

Figure 9 is a horizontal cross sectional view taken on line 9—9 of Figure 5 looking in the direction of the arrows showing the manual control means for the change speed gearing illustrating the detent mechanism therefor in detail.

Figure 10 is a vertical cross sectional view taken on lines 10—10 of Figure 5 looking in the direction of the arrows illustrating in detail the adjustable limit stop for limiting the movement of one of the turret head supporting slide members whereby the cutter movement toward the work may be arrested when the desired cut has been produced.

Figure 11 is a side elevational view of the change speed gearing illustrating a belt tightener applied to one of the driving belts to prevent loose play in the drive.

Figure 12 is an enlarged fragmentary view of the turret cutter head illustrating the manner in which the cutters are held therein, and Figure 13 is a diagonal sectional view taken on line 13—13 of Figure 12 looking in the direction of the arrows further illustrating the manner in which the cutting tools are mounted in the rotary turret cutter head.

*General description*

The invention comprises a rotary work holder adapted to receive a piece of circular work to be grooved or cut on its internal or external surface to provide two or more annular grooves which are accurately finished with respect to depth and circular size. Also, the invention includes a turret tool carrier presented to the work holder in such a manner as to facilitate the feeding of the cutting tools into and out of engagement with the work so that annular cuts may be made of various depths, dependent upon the predetermined adjustment of variable stop members employed for limiting the feeding movement of the turret cutter head. Further, the invention provides a variable speed drive for the work table to facilitate various speeds thereof as desired such as when making cuts of various depths.

The turret cutter head is mounted on vertical and horizontal guides so as to be movable in a vertical direction as well as a horizontal direction and is adapted to be moved by means of hydraulic or fluid pressure means controlled from a common control point so that the operator will be able to control the machine more easily and may guide the cutter head toward the work more rapidly. Fluid under pressure is admitted to the fluid pressure turret head moving means by a suitable pump driven by a motor mounted on the base of the machine so that a constant source of fluid under pressure will be available at all times. The control means alternately connects the fluid supply to the opposite ends of the fluid pressure turret head moving means and likewise connects the return from the cylinders to the intake of the suppy source so that movement of the slides may be permitted independently or simultaneously.

In the drawings, wherein for the purpose of illustrating the invention and wherein like reference characters will be employed to designate like parts thereof, the reference character 5 will generally be employed to designate a rectangular machine base having a top wall 6 and a marginal depending rib 7 terminating in a flanged foot portion 8. The base 5 is adapted to rest upon a work table or other substantially level support.

One corner of the base 5 is arcuately cut away as at 9 for the purpose of receiving a circular work table base, generally indicated by the reference character 10. The circular base is formed of a disk-like floor portion 11 having an annular flange 12 terminating in an annular foot portion 13 likewise adapted to rest upon a table or other support which is substantially level and horizontal. The base 10 is adapted to be secured to the base 5 and to facilitate a connection therebetween, clamping lugs 14 and 15 are formed integral with the depending flange 7 at each end of the arcuately cut-away portion 9. Bolts or the like, as at 16 extend through the respective clamping lugs 14 and 15 and have their threaded ends anchored in suitable openings 17, likewise threaded, and formed on the clamping bosses 18 on the depending flange 12 spaced circumferentially to align with the clamping lugs 14 and 15.

The rotary work table 10 includes a cylindrical shaft bearing 20 having an annular flange 21 which is bolted to the base floor 11 by means of suitable machine screws 23 having their threaded ends anchored in correspondingly threaded openings 24 likewise in the base floor 11. The cylindrical support and bearing 20 is flanged at its upper end as at 25 for providing a seat 26 upon which are positioned shims 27 held in place by circumferentially spaced pins 28. The shims 27 may be formed of relatively hardened material and circular in shape conforming with the circular size of the cylindrical bearing 20. Mounted within the circular bearing 20 is a vertical spindle 29 locked against displacement by set screws 30 extending through threaded openings 31 so that the inner pointed ends will engage and lock the vertical spindle 29 against movement.

Mounted around the peripheral edge of the circular base 10 and extending upwardly therefrom is a series of supporting blocks 32 having spaced vertical supporting ribs 33 connected to the bottom by means of an integrally formed flange plate 34 and at the top by a similarly formed plate 35. The blocks 33 are equi-distantly spaced circumferentially and the lower flange plates 34 are adapted to be held in place upon the base floor 11 by means of suitable machine screws or bolts 36 extending through the flange plate so that the threaded ends may be anchored in correspondingly formed openings in said circular base 11. The upper flange plates 35 of the blocks 32 are provided with a sector plate 37 bolted in place by means of suitable machine screws 38 which are countersunk in the plate 37 to provide a relatively flush top wall or face 39.

Rotatably mounted upon the vertical spindle 29 is a work supporting table 40 having a central cylindrical bearing 41 formed integral therewith for receiving a tapered adjustable bearing wear take-up collar 42 in its bore as at 43. The upper end of the bore 43 is enlarged as at 43a for accommodating the flange 42b of said sleeve. The vertical spindle 29 extends into the bearing sleeve 42 and terminates a distance below the surface of the top wall of the work table 40. A series of adjusting screws 42a are threaded in suitable circumferentially spaced openings in the flange 42b of the wear take-up collar to raise or lower the same and thereby allow the adjustment of the table 40. Directly above the spindle bearing 41, the bore 43 is further enlarged, as at 44 for receiving the marginal edge portion 45 of closure plate 46 held in place by means of suitably spaced fastening bolts 47 countersunk so that the heads thereof will be flush with the work table surface 40. The lower portion or edge of the cylindrical bearing 41 is provided with a shim 48 fastened in place by circumferentially spaced pins 49 similar to the shims 27 on the upper edge of the cylindrical bearing 20. Interposed between the shims 27 and 48 is an annular member 50 formed of relatively hard metal so as to provide a thrust bearing so that the table 40 will seat properly and will be positioned in true horizontal relationship.

An annular upstanding flange 51 is formed integral with the annular flange 25 so as to produce an annular cavity 52 adapted to receive a lubricant and thereby feed such lubricant to the faces upon opposite sides of the annular member 50. Depending from the bottom surface of the work table 40 is an annular rib 53 having a substantially flush seating surface 54 provided with a bearing ring 55 similar to the bearing ring 37 connecting the circumferentially spaced blocks 32. Machine screws 56 extend through the bearing ring 55 and are threaded in suitable openings formed in the seating surface 54 and the machine screws 56 have their heads countersunk so as to lie flush with the surface of the bearing ring 55. It is to be noted that the bearing ring 55 is of a greater width than the annular rib 53 so that a portion thereof will project therefrom directly beneath an anchoring ring 57 secured to the connecting ring 37 and spaced therefrom by annular arcuate spacing strips 58. Machine screws 59 extend through the anchoring ring 57, spacing ring 58 and connecting ring 37 so that their free ends may be threaded in openings 60 formed in the top plate 35 of each block 32.

The structure above described provides a rotary work table which may be rotated at various speeds and which will always travel parallel to the horizontal without deviating therefrom by reason of the accurately machined rings 50 and the accurately machined seating surface rings 37 and 55. Since there are no irregularities in the supporting ring, the table 40 may be adapted to support work of circular shape and relatively large diameter such as a ring R intended to be used as a bearing ring member for relatively heavy and large structures. Secured around the edge of the work table 40 is an annular work supporting channel member 61 having its flanges 62 bolted in place by suitable machine screws 63. The channel member 61 is provided with a cutaway portion 64 for receiving an annular boss B formed on the work piece or ring R.

A series of work clamping plates 65 are positioned above the annular boss B of the work piece R and are provided with suitable openings 66 for receiving clamping bolts 67 which likewise extend through circumferentially spaced openings 68 in the bracket and through correspondingly spaced openings O in the anular work piece boss B. Nuts or the like as at 70 are threaded on the ends of the bolts 67 to securely clamp the work piece R in place and the bracket 61 is provided with a series of spaced openings for receiving a fulcrum pin 72 having a threaded portion upon which is received an adjusting nut 73 to limit the movement of the pin 72 in the opening of the bracket 61. The upper end of the fulcrum is pointed, as at 74, and is adapted to be received in a slight depression 75 formed in the under surface of the work clamping plates 65.

It is obvious that tightening of the nut 70 on the bolt 67 will cause the inner edge of the clamping plate 65 to tightly grip the work piece R as is clearly shown in Fig. 4. The upper surface of the work supporting bracket 61 may be in any desired configuration and if desired, a series of such brackets may be provided to accommodate various shapes and forms of the work pieces R.

Depending from the under surface of the rotary work supporting table 40 is an annulus 76 formed integral with said under surface between the bearing collar 41 and annular marginal rib 53. Bolted to the lower edge of the annulus 76 is a worm wheel of ring formation 77 having a flange 78 bolted in place by means of suitable machine screws 79. The worm wheel 77 is provided with worm engaging teeth 80 adapted to be coupled and meshed with a worm drive which will be presently fully described.

Mounted within the confines of the equi-distantly spaced circumferentially arranged blocks 32 is a gear housing 81 having an inclined floor 82 and end walls 83 and 84 connected by suitable side walls 85. Flanges 86 are formed on the end walls 83 and 84 and are adapted to be secured to the base floor 11 by means of suitable bolts 87.

A bearing boss 88 is formed in the end wall 83 and is provided with a bearing opening 89 in which is received the outer bearing ring 90 of a ball race 91. The inner race member 92 is adapted to support a drive shaft 93 extending into the end wall 83 and through the opening 89 thereof so that the opposite reduced free end 94 may be provided with an inner race member 95 held in place by a collar 96 fastened in place on the shaft 94 by suitable fastening means. Anti-friction balls 97 are received between the outer race member 98 and the inner race member 95 so that the free end 94 of the drive shaft 93 will likewise be anti-frictionally supported. The outer race member 98 is supported in a sleeve 99 mounted in an annular bearing boss 100 formed in the end wall 84 and the outer race member 98 and bearing sleeve 99 are fastened and held in place within the bearing opening 101 of the bearing boss 100 by means of a closure plate 102 secured in position by means of circumferentially spaced bolts 103. The outer race member 98 is urged toward an inwardly extending flange 104 formed on the bearing sleeve 99 by means of a ring 105 which engages the outer race member 99 and is moved into contact thereto by engagement with the closure plate 102 when the bolts 103 are tightened in place as is clearly shown in Fig. 8.

A retaining collar 106 is mounted on the shaft 93 and is held in place by means of a locking pin 107 extending therethrough and lockingly engaging with the shaft 93 and said retaining ring 106 prevents endwise movement of the shaft 93 by reason of the fact that it directly engages the inner race member 92.

Bolted to the annular bearing boss 88 is a sealing ring 108 positioned in place by suitable bolts or the like, as at 109, and said sealing ring carries packing strips 110 which engage the shaft and seal the same against the entrance of foreign matter, such as cuttings, chippings and the like.

Keyed to the shaft 93 within the housing 81 is a worm 111 having its spiral teeth 112 in mesh with the worm wheel 77 on the work table 40 and it is to be noted that the gear housing 81 has one of its side walls 85 slotted as at 113 for allowing the projection of the peripheral portion and teeth of the worm wheel 77. The top connecting wall 114 of the gear housing 81 is curved to conform to the curvature of the worm 111. A key slot is formed in the worm 111 in alinement with a similar key slot in the shaft 93 so that a locking gib 115 may be placed therein to rigidly lock the worm 111 to the shaft 93. Suitable spacing collars 116 are mounted on opposite sides of the worm 111 and surround the shaft 93 so that the collars will engage the respective inner bearing race members 92 and 95 and prevent endwise movement of the worm 111. It is obvious that rotation of the shaft 93 will likewise affect rotation of the worm 111 to drive the work table 40 through the medium of the ring-shaped worm wheel 77. If desired, the shaft 93 may be driven by an electric motor but it is contemplated to drive the same by means of a hydraulic type motor which may be regulated so as to impart rotary speeds to the work table 40 of various R. P. M.

The motor drive above mentioned is wholly supported on the machine base 5 and as illustrated in Fig. 5, embodies a motor 118 of a fluid turbine type having a base 119. The base 119 is supported by a sub-base 120 which is fastened to the floor 11 by means of bolts or the like 121. Likewise bolts 122 extend through the base 119 and anchor the same to the base 120. The motor may be provided with an expansible fluid inlet 123 and an exhaust 124 for the armature and exhaust of the driving fluid. A bearing 125 is formed in one wall of the motor 118 through which projects the rotor shaft as at 126.

Also mounted on the base floor 11 in direct alinement with the motor 118 is a pair of spaced bearing supporting brackets 127 and 128 having their respective foot portions 129 and 130 bolted or otherwise secured to the base floor by means of bolts 131. The upper end of each of the brackets 127 and 128 is provided with a journal bearing 132 and 133 in which is rotatably supported a drive shaft 134. One end of the drive shaft is provided with a collar 135 forming a section for a flexible coupling including an enlarged portion 136 having diametrically spaced grooves 137 in which is positioned a flexible member 138. The other section of the flexible coupling is similarly formed and is indicated, as at 139, and is likewise secured to the motor shaft 126. A diametrically disposed groove 140 is positioned at right angles to the groove 137 so that the flexible couplings 136 and 139 will have limited relative motion.

Rotatably mounted upon the shaft 134 is a pair of spaced pulley hubs 141 and 142 having pulley rims 143 and 144 respectively, of different diameters. Each of the pulley hubs 141 and 142 is provided with an extension 145 and 146 respectively upon which is formed clutch teeth 147 and 148. Slidably mounted upon the shaft 134 and geared thereto is a clutch collar 149 having an annularly formed groove 150 and said clutch collar is provided on its radial faces with clutch teeth 151 and 152 adapted to alternately engage the respective clutch teeth 147 and 148 on the pulley collars 141 and 142. The clutch collar 149 is slidably carried to the shaft 134 by means of a gib 153 seated in a slot in the shaft and likewise seated in a slot in the collar. The pulleys 143 and 144 are limited against endwise movement by means of collars 154 and 155 secured to the shaft 134 so as to engage the outer wall of the respective hubs 141 and 142. Likewise retaining collars 156 and 157 are positioned on the shaft 134 and are engaged by the opposite ends of the key 153 to prevent movement of the pulleys 143 and 144.

Mounted in spaced relation and parallel to the shaft 134 is a driving shaft 158 which is similarly supported by bearing brackets 159 and 160 at its opposite ends. Bearing caps 161 and 162 are mounted on top of the brackets 159 and 160 and said brackets and bearing caps may be bolted together in any suitable position. Rotatably mounted on the shaft 158 is a pair of belt pulleys 163 and 164, the respective hubs of which, as at 165 and 166, being provided with clutch teeth 167 and 168 for engaging the clutch teeth 169 and 170 formed on a sliding collar 171 which is secured to the shaft 158 by means of a suitable key similar to the key 153 shown in Fig. 5. The clutch collar 171 is provided with an annular groove 172 similar to the groove 150 in the clutch collar 149. The end of the shaft 158 is provided with a flexible coupling 173 which is connected to the shaft 93 extending into the gear housing or casing 81. Each of the pulleys 143, 144, 163 and 164 is provided with a series of V-shaped grooves for receiving a series of driving belts and as shown in Fig. 1, the pulleys 143 and 163 are coupled by a series of V-shaped driving belts 175 while the pulleys 144 and 164 are coupled by a series of V-shaped driving belts 176. The driving belts 175 and 176 are trained over their respective pulleys whereupon rotation of the shaft 126 of the motor 118 may be imparted to the shaft 158 through the shaft 134 so that the table 40 may be rotated at various speeds. In order to facilitate the variable speed drive a rod 177 extends between the clutch collars 149 and 171 and is provided on its opposite ends with yokes 178 and 179 rotatably received in the grooves 150 and 172 of the respective clutch collars 149 and 171. An operating rod 180 is connected to the intermediate portion of the rod 177 and said operating rod 180 may be reciprocated by means of a handle control 181 pivoted to a bracket 182 carried by a housing, generally indicated as 183. A bell crank lever portion 184 is formed on the handle control 181 and is pivoted to the bracket 182 as at 185 and has one of its ends connected to the operating rod 180 by means of a pivot pin 186. The opposite end of the bell crank 184 is provided with a pair of spaced arms 187 carrying a pivot pin 188 to which is pivoted a latch lever 189 so that the latched portion thereof, as at 190 may engage within a series of spaced notches 191 in a face plate 192. A coil spring 193a is provided and has one of its ends engaging the handle 181 while the opposite end engages the handle portion of the latch lever 189 to normally urge the latch 190 into the notches 191 in the face plate 192. As shown in Figs. 5 and 9, the bracket 182 and face plate 192 are formed integral and is secured to a control panel 193 mounted on the front wall 194 of the housing 183. It will thus be obvious that vertical locking movement of the handle 181 on the pivot pin 185 will reciprocate the rod 180 and cause the clutch collars 149 and 171 to be shifted alternately into engagement with the clutch teeth 147—148 and 167—168 respectively, thereby coupling the shafts 134 and 158 through said V-shaped drive pulley belts 175 or 176. Since the pulleys 143 and 144 are of different sizes and likewise, the pulleys 163 and 164 are of different sizes, two different speeds are provided for driving the shaft 158 on the table 140. The housing 183 is mounted upon the base floor 11 secured thereto by bolts or the like and said housing is provided with an opening in its rear wall 195 as at 196 by the extension of the shaft 134 whereby the motor 118 will be housed by the casing 183 to prevent the entrance of dirt or other foreign matter. The top wall of the casing 183 is substantially horizontal, as at 197, for a portion of its width and is provided with an arcuately curved portion 198 connecting the top portion 197 with the front wall 194 by means of an offset portion 199 providing a platform surface 200. The housing 183 extends substantially the full length of the rectangular base 5 and said housing is bolted thereto by means of suitable bolts or the like, as at 201.

Mounted on the top wall 197 of the housing 183 is a casting 202 having formed integral with one edge thereof, as shown in Fig. 5, an offset portion 203. A horizontal slide guide plate extends perpendicularly from the offset portion 203 and is generally indicated by the reference character 204. Bolts or the like, as at 205, extend through the casting 202 so as to anchor the same securely to the top wall 197 of the housing 183. Reenforcing webs 206 connect the casting 202 to the vertical slide guide plate 204 and said reenforcing webs 206 are equi-distantly spaced and formed integral with the casting 202 and vertical slide guide plate 204. As shown in Fig. 1, the end reenforcing webs 206 extend upwardly from the intermediate portion as well as the end edges of the casting 202 so that the vertical slide guide plate 204 will be reenforced throughout its length and not become warped and out of alinement.

Slidably mounted upon the slide guide plate 204 is a horizontal slide 207 having its top and bottom edges provided with rearwardly extending flanges 208 adapted to engage the top and bottom edges of the slide guide plate 204. Retaining strips 209 are bolted to the flanges 208 by means of bolts or the like, as at 210, and said retaining strips slidably engage with the cutaway portions 211 formed at the top and bottom of the slide guide plate 204 whereby the slide 207 may be guided on the slide guide plate and the retaining strips 209 may overlie the cutaway portions 211. Formed integral with the slide 207 and adjacent each end thereof is a pair of bosses 212 and 213 and bolted to said bosses is a cylinder 214 having oppositely extending lugs 215 and 216 at each end thereof. Bolts 217 extend through the lugs 215 and 216 and have their inner ends threaded in correspondingly threaded openings formed in the bosses 212 and 213. A piston 220 is mounted for reciprocation within the cylinder 214 and is provided with a piston rod 221 extending through a packing 222 formed integral with one end of the wall 223 of the cylinder 214. The opposite end of the piston rod 221 is securely fastened to an extension 224 formed integral with the perpendicular slide guide plate 204 and said extension 224 is provided with a bracket 225 secured in place by means of bolts or the like, as at 226. The bracket 225 is provided with a bore 227 through which the threaded end 228 of the piston rod 221 extends so that nuts 229 and 230 may be threaded on the end of the piston rod to clampingly engage the bracket 225 and thereby secure the piston rod 221 against movement.

Formed integral with one end of the slide 207 is an enlarged head 231 having a central channelway 232 and communicating with the central channelway is a longitudinal slot 233 formed directly opposite the slide plate 204. The slot 233 is adapted to slidably support a vertically sliding head 234 having a reduced portion 235 of substantially the same width as the slot 233 so as to be received therein and guided thereby. The vertically moving slide head 234 is provided with a pivot pin 236 upon which is mounted a rotary turret head 237 adapted to support a series of cutting tools around the peripheral portion thereof so that said cutting tools may be brought into engagement with the work R by simply shifting the head 237. The pivot pin 236 extends through a central opening 238 in the turret head 237 and said pin is threaded on its free end as at 239 for receiving a pair of lock nuts 240 adapted to clampingly secure the head 237 to the slide 234. The vertically moving slide 234 is provided with a series of equi-distantly spaced pins 241 which project beyond the outer surface of the vertically moving slide 234 for being received in centrally spaced openings 242 formed on the turret tool carrier head 237. The pins 241 are secured in position by means of set screws or the like as at 243 to prevent their displacement when the turret head 237 is being changed relative to the vertically moving slide 234. As shown in Figs. 12 and 13, the turret head 237 is cut away as at 245 for receiving the cutting tools 246 and said cutting tools are backed up by a backing plate 247 secured in place by means of bolts 248 the heads of which are flush with the exposed wall of the backing plate so that the cutting tools 246 may lie flush therewith. An anchor plate 249 is bolted over the cut-away portions 245 and is secured in place by machine screws 250 or the like. Tool engaging screws 251 extend through the plate 249 and are threaded therein so that they may be forced into engagement with the tools 246 to securely lock the tools into position. As shown in Fig. 12, spaces 252 may be provided between adjacent tools by leaving the metal remain between the cut-out portions 245 and, if desired, the tools 246 may be spaced by spacing blocks inserted therebetween. The turret head 237 is provided with projections 253—254—255 and 256 which are increased in size and are stepped in such a manner as to facilitate the positioning of the tools 246 at various angles with respect to the radius of the turret head. It is to be noted that the sliding head 234 is dovetailed and likewise, the guide slot 233 is similarly shaped so as to prevent the displacement at the vertical moving slide 234 as is best shown in Fig. 6.

Extending along one edge of the dove-tailed slide part 235 is a wear compensating gib 255a adapted to be urged into engagement with the dove-tailed slide part 235 by means of a screw or the like as at 256a.

Secured to the rear wall of the dove-tailed slide part 235 is an anchor block 257 bolted or otherwise secured in place by means of relatively long bolts 258 extending through openings therein and having the threaded ends received in correspondingly threaded openings 259 in the rear wall of the dove-tailed slide part 235. The anchoring block 257 is provided with a transverse bore 260 for receiving the lower end of a piston rod 261 which is threaded as at 262 so that nuts 263 may be threaded thereon to clampingly engage the anchoring block 257. Mounted on the top of the enlarged head 231 is a casting 264 and interposed between the enlarged head 231 and casting 264 is a shim block 265 which has both of its opposed faces machined so as to extend in parallel planes. The casting 264 is bolted to the enlarged head 231 by means of anchor bolts 266 extending therethrough so that the lower threaded ends are received in the shim block 265. The shim block 265 is likewise bolted to the enlarged head 231 by means of the bolts 267 extending therethrough and anchored in correspondingly threaded openings in the top wall of the enlarged block 231. The casting 264 is provided with a central threaded opening 268 for receiving the lower threaded end of a cylinder 270 which is likewise externally screw-threaded as at 271 for being coupled to the casting 264. The casting 264 is provided with a bottom wall 272 having a central opening surrounded by an annular boss 273 for receiving a gland nut 274 so that the piston rod 261 may project through the wall 272 and through the annular boss 273 and be sealed against fluid passage by means of a packing or sealing ring 275. The upper end of the piston rod 261 is connected to a piston 276 reciprocably mounted within the cylinder 270 so that when fluid is admitted under pressure to opposite sides of the piston the dove-tailed slide 234 will likewise be reciprocated to move the turret head 237 toward and away from the work R.

The upper end of the cylinder 270 is internally screw-threaded as at 277 for receiving a closure plug or head 278 which is likewise threaded as at 279 and said closure plug or head 278 is provided with a projection 280 having a bore 281 communicating with one side of the piston 276. The casting 264 is provided with a bore 282 likewise communicating with the opposite side of the piston 276.

It is to be noted that the cylinder 214 is provided at one end with a head 283 having a fluid passage port 284 while the head 223 is likewise provided with a similar fluid passage port 285. Means is provided for supplying fluid under pressure to the respective cylinders 214 and 270 and said means includes a pumping apparatus mounted on a base 286 secured to the floor 11 of the base 5.

Mounted at one end of the base 286 is a gear type pump 287 having a pulley 288 connected to its rotor shaft and said pulley 288 is adapted to be driven by means of an electric motor 289 having a pulley 290 secured to its armature shaft 291. A drive belt 292 is trained over the pulleys 288 and 290 to cause rotation of the pump rotor. The base 286 is hollow and provides a reservoir for liquid material such as oil or the like and connected with said reservoir is a pipe 293 which extends downwardly therein by means of an elbow 294. The opposite side of the elbow 294 is connected by an elbow fitting 295 and gland nut 293a to the inlet of the pump 287 so that said fluid will be exhausted from the pump through the outlet 296 to a manifold 297 for supplying fluid to the opposite ends of the respective cylinders 214 and 270.

The fluid under pressure from the manifold 297 is supplied to a pair of control valves 298 and 299 by the respective pipe connections 300 and 301. The valves 298 and 299 are mounted in the control panel 193 in the front wall 194 of the housing 183 and each of the control valves is provided with a handle and indicating pointer 302 and 303 respectively so that the relative positions of the valves may be determined by registering the handle pointers 302 and 303 with graduated dials 304 and 305 respectively. The valves 298 and 299 may be of four-way type and each valve is provided with a pipe 306 and 307 for connecting the valve to the reservoir 286. The valve 298 is adapted to control admission of the fluid under pressure to opposite sides of the piston 220 mounted in the cylinder 214 and this is accomplished by providing flexible hose connections 308 and 309 adapted to communicate with the ports 284 and 285 respectively at each end of the cylinder 214. The pipes 308 and 309 are connected to supply pipes 310 and 311 connecting the valve 298 so that when the valve is turned in one of its positions, fluid will be supplied from the manifold 297 through the valve and to one end of the cylinder 214 whereupon the opposite connection will be in communication with the valve 298 with the reservoir 286 through the return pipe 306. The other valve 299 operates in substantially the same manner and is adapted to control fluid under pressure to opposite sides of the piston 276 mounted in the cylinder 270. To accomplish this, flexible pipe connections 312 and 313 are connected to opposite ends of the cylinder in communication with the respective ports 281 and 282 and said flexible feed pipes 312 and 313 are connected to parallel supply pipes 314 and 315 respectively. The opposite ends of the supply pipes 314 and 315 are connected to pipes 316 and 317 connecting the valve 299 so that manipulation of the valve 299 by turning the pointer handle 303 will alternately supply fluid under pressure to opposite sides of the piston 276 through one of the pipes 312 or 313 while the opposite pipe will connect through the valve 299 to the reservoir 286 by the return pipe 307.

It will be obvious that well known types of valves may be employed for the valves 298 and 299 and, therefore, the specific valve construction has not been shown although it is to be understood that when one of the valves is turned to communicate the fluid pressure from the exhaust side of the pump 287 to one side of one of the cylinders the opposite side of the cylinder will be in communication with the reservoir 286 to allow the bleeding of the piston. The pipes 310, 314 and 315 are supported in suitable bracket plates 318 secured to the intermediate reenforcing webs 206 on the casting 202 so that the pipes 310, 314 and 315 will remain stationary while the flexible pipes 308, 309, 312 and 313 will allow sliding movement of the slide 207 with respect to the slide plate 264. The reservoir 286 may be provided with a filler spout 320 having a filler cap 321 for the purpose of replenishing the fluid, such as oil, in the reservoir as the supply is diminished.

It is to be noted that the manipulation of the valve 298 may control the sliding movement of the slide 207 in a horizontal direction while the manipulation of the valve 299 may control the movement of the sliding head 234 in a vertical direction. In this manner the turret head 237 may be moved toward and away from the work in a vertical direction as well as a horizontal direction.

Means is provided for limiting the vertical and horizontal movement and the means for limiting the horizontal movement of the turret head 237 and the slide 207 includes a bracket portion 322 formed integral with the slide reenforced by a web portion 323 interconnecting the bracket and slide 207.

Secured to the bracket 322 is a bearing bracket 324 the base of which is bolted to the bracket 322 by means of suitable bolts 325. The bearing bracket 324 is provided with a bearing boss 326 for rotatably receiving a shaft 327 upon the opposite ends of which are keyed cylinders 328 and 329. The cylinders 328 and 329 are keyed to the shaft 327 by means of keys 330 and 331 respectively so that the cylinders will rotate or revolve in unison.

Threaded on each of the ends of the shaft 327 is a pair of nuts 332 and if desired, washers 334 may be interposed between the nuts 332 and cylinders 328 and 329 to assist in locking the nuts against displacement.

The cylinder 329 is provided with a series of equi-distantly circularly spaced depressions 335 for receiving a spring-pressed plunger 336 slidably mounted in a recess 337. The plunger 336 is urged into engagement with one of the depressions 335 by means of a coil spring 338 seated within the opening or cavity 337.

Each of the cylinders 328 and 329 is provided with arcuately extending circularly arranged threaded bores 339 and 340 respectively which are circularly spaced in alinement with the depressions 335 and plunger 336 so that the cylinders will come to rest and will be frictionally held so that a pair of axially alined threaded openings 339 and 340 will be presented to suitable stop members.

Adjustably mounted in the circularly spaced threaded openings 339 and 340 is a series of screw-threaded pins 341 and 342 adapted to be threaded in and out of the axial screw-threaded openings 339 and 340 to increase or decrease the over-all length between the ends thereof when a certain pair are brought into alinement with the stop members 343 and 344 as shown in Fig. 2. The stop members 343 and 344 constitute pins supported by brackets 345 and 346 formed integral with the shelf 200 of the housing 183. The pins 343 and 344 are inserted in suitable openings in the stop brackets 345 and 346 respectively. It is to be noted that the alined axially arranged stop pins 341 and 342 are so carried by the cylinders 328 and 329 that a pair of stop pins may be brought into registry and alinement between the stop pins 343 and 344 so that the slide 207 will come to rest and will be limited against further movement when either of the stop pins engages either of the stop members 343 and 344. The stop pins 341 and 342 are adapted to be adjustably held in position by means of knurled nuts 348 and 349 respectively threaded thereon to facilitate the locking of the screw-threaded stop pins after an adjustment has been made by suitable calipering instruments. It is intended to adjust the screw-threaded stop pins 341 and 342 a predetermined amount so that the distance between the outer ends of the stop screws will be of predetermined value thereby merely making it necessary to rotate the cylinders 328 and 329 to bring any desired pair of stop pins into registry with the stop members 343 and 344.

Each of the cylinders 328 and 329 is provided with a pair of cut-out notches 350 which are alined so that the notches may be brought into registry with the stop members 343 and 344 thereby allowing the slide 207 to move its full length due to the fact that the stop pins and cylinders have been removed from the path of the stop members 343 and 344.

A somewhat similar device is provided for limiting the vertical movement of the slide 234 and includes a bracket arm 351 having its base portion 352 bolted to the slide by means of suitable bolts 353. The free end of the bracket arm 351 is formed with a bearing boss 354 for the reception of a stub shaft 355 similar to the shaft 327. Keyed to each end of the shaft 355 is a cylinder 356 and 357 having a series of axially alined screw-threaded bores similar to the bores 339 and 340 shown in Fig. 10. Threaded in each of the bores in the cylinder 356 and 357 are suitable stop pins 358 and 359 capable of being adjusted in the same manner as the stop pins 341 and 342. Likewise the stop pins 358 and 359 are provided with knurled lock nuts 360 and 361 to lock the stop pins 358 and 359 in an adjusted predetermined position. Each of the cylinders 356 and 357 is cut away as at 362 so that the stop means may be eliminated when desired during certain work.

Mounted on the sliding head 231 on opposite sides and in the path of a pair of alined stop pins 358 and 359 is a pair of brackets 363 and 364 fastened in place by suitable machine screws and each of the brackets is provided with a stop arm 365 and 366 respectively providing stop members adapted to be engaged by alined pairs of stop pins 358 and 359 when the slide 234 moves in a vertical direction. A spring-pressed detent similar to the plunger 336 is provided in the bearing boss 354 for being received in suitable depressions circularly and equi-distantly spaced in one of the cylinders 356 or 357.

As shown in Fig. 1, the belts 175 and 176 are provided with belt tightening means, generally indicated as at 370 and 371. Both of the belt tighteners are identical and so it will only be necessary to describe one in detail.

By reference to Fig. 11, it will be noted that a bracket 372 has its base 373 secured to the machine base 5 and to the floor 6 thereof by means of suitable bolts 374. The bracket 372 is channel-shaped and is provided at the top portion with a transverse shaft 375 connecting the flanges of the channel and pivotally mounted on said shaft 375 is a pair of arcuately spaced roller supporting arms 376 connected at the free end by means of a transverse anchor rod 377 so that a roller 378 may be supported on a roller pin 379 likewise secured between the free ends of the arcuately curved arms 376. The roller 378 is adapted to engage the belts 175 and 176 and may be urged toward said belt by means of a screw adjustment 380 loosely mounted in a connecting bar 381 so that the threaded end will be received in a screw threaded opening in a transverse connecting bar 382 connecting the opposite ends of the arcuately curved arms 376. The arcuately curved arms 376 are adapted to partially encircle the pulleys 143 and 144 so that the roller will engage the respective belts 175 and 176. It is obvious that tightening of the bolt 380 by the application of a wrench thereto will affect the adjustment in relative position of the roller with respect to its operative belt.

In operation the work piece R is bolted in position upon the rotary work table and the motor 118 is started to drive the shaft and work table. By manipulating the hand lever 189 to clutch or unclutch the respective drive pulleys the proper speed may be obtained so that the rotatable table will be rotated at the desired speed. The turret head may then be adjusted to position a groove in the cutters with respect to the work so that operation of the valve pointer levers 302 and 303 may control the movement of the turret head toward and away from the work in a vertical and horizontal direction.

In operating upon a piece of work as shown in the drawing, the group of cutting tools may be lowered by manipulating the valve lever 303 to the proper depth determined by the stop pins 358 and 359 whereupon the other valve lever 392 may be operated to cause the turret head 237 to move the group of tools into engagement with the work R a distance which will be controlled by the stop pins 341 and 342. In this manner, a series of cuts or annular grooves may be formed in the work piece R by rotating the work piece under and in engagement with a series of cutting tools and it is obvious that various contours may be cut and provided for by simply changing the grouping or arrangement of the cutting tools 346.

It is to be understood that the form of the invention herewith shown and described is to be taken as a preferred embodiment of the same and that various changes in the shape, size, and arrangement of parts may be resorted to without departing from the spirit of the invention or the scope of the subjoined claims.

What we claim is:

1. A vertical cutting machine, comprising a rectangular base having a cut-away corner, a round base mounted in the cut-away corner, a rotary work table mounted on the round base adapted to support a piece of work for circular cutting, means for rotating the work table, a cutting means, said rectangular base including a vertical portion adjacent said cut away corner, and means on said portion for supporting said cutting means at said corner and over said table in cutting relation to a work piece mounted thereon, whereby clearance is provided adjacent the juncture of said rectangular and round bases for an operator in the visible inspection of the cutting operation in the vicinity of said corner.

2. A vertical cutting machine, comprising a rectangular base having a cut-away corner, a round base mounted in the cut-away corner, a rotary work table mounted on the round base adapted to support a piece of work for circular cutting, means for rotating the work table, a cutting means, said rectangular base including a vertical portion adjacent said cut away corner, and means on said portion for supporting said cutting means at said corner and over said table in cutting relation to a work piece mounted thereon, and control means for the afore-mentioned means located adjacent the juncture of said rectangular and round bases for an operator in the visible inspection of the cutting operation in the vicinity of said corner.

3. A vertical cutting machine comprising a rectangular base having a cut-away corner, a round base mounted in the cut-away corner and secured therein around the circular edge of said base, a rotary work table mounted on the round base adapted to support a piece of work for circular cutting, means for rotating the work table, a cutting means, said rectangular base including a vertical portion adjacent said cut-away corner, and means on said portion for supporting said cutting means at said corner and over said table in cutting relation to a work piece mounted thereon, whereby clearance is provided adjacent the juncture of said rectangular and round bases for an operator in the visible inspection of the cutting operation in the vicinity of said corner.

4. A vertical cutting machine comprising a rectangular base having a cut-away corner, said corner being cut away in an arc of a circle, a round base mounted in the cut-away corner nesting with and secured in the arcuate cut-away corner, a rotary work table mounted on the round base adapted to support a piece of work for circular cutting, means for rotating the work table, a cutting means, said rectangular base including a vertical portion adjacent said cut-away corner, and means on said portion for supporting said cutting means at said corner and over said table in cutting relation to a work piece mounted thereon, whereby clearance is provided adjacent the juncture of said rectangular and round bases for an operator in the visible inspection of the cutting operation in the vicinity of said corner.

5. A vertical cutting machine comprising a rectangular base having a cut-away corner, a round base mounted in the cut-away corner, a rotary work table mounted on the round base adapted to support a circular piece of work for circular cutting, means for rotating the work table, a cutting means, said rectangular base including a vertical portion adjacent said cut-away corner, and means on said portion for supporting said cutting means at said corner and over said table in cutting relation to a work piece mounted thereon, whereby clearance is provided adjacent the juncture of said rectangular and round bases for an operator in the visible inspection of the cutting operation in the vicinity of said corner.

6. A vertical cutting machine comprising a rectangular base having a cut-away corner, said corner being cut away in an arc of a circle, a round base mounted in the cut away corner nesting with and secured in the arcuate cut-away corner, a rotary work table mounted on the round base adapted to support a piece of work for circular cutting, means for rotating the work table, a cutting means, said rectangular base including a vertical portion adjacent said cut-away corner, means on said portion for supporting said cutting means at said corner and over said table in cutting relation to a work piece mounted thereon, and control means for the aforementioned means located adjacent the juncture of said rectangular and round bases for an operator in the visible inspection of the cutting operation in the vicinity of said corner.

7. A vertical cutting machine comprising a rectangular base having a cut-away corner, a round base mounted in the cut-away corner and secured therein around the circular edge of said base, a rotary work table mounted on the round base adapted to support a piece of work for circular cutting, means for rotating the work table, a cutting means, said rectangular base including a vertical portion adjacent said cut away corner, means on said portion for supporting said cutting means at said corner and over said table in cutting relation to a work piece mounted thereon, and control means for the afore-mentioned means located adjacent the juncture of said rectangular and round bases for an operator in the visible inspection of the cutting operation in the vicinity of said corner.

8. A vertical cutting machine comprising a rectangular base having a cut-away corner, a round base mounted in the cut-away corner, a rotary work table mounted on the round base adapted to support a circular piece of work for circular cutting, means for rotating the work table, a cutting means, said rectangular base including a vertical portion adjacent said cut-away corner, means on said portion for supporting said cutting means at said corner and over said table in cutting relation to a work piece mounted thereon, and control means for the afore-mentioned means adjacent the juncture of said rectangular and round bases for an operator in the visible inspection of the cutting operation in the vicinity of said corner.

JOHN HALLER.
LOUIS V. THOMPSON.

REFERENCES CITED

The following references are of record in the file of this patent:

UNITED STATES PATENTS

| Number | Name | Date |
|---|---|---|
| 683,592 | Bullard | Oct. 1, 1901 |
| 1,478,686 | Teller | Dec. 25, 1923 |
| 2,118,020 | Curtis | May 17, 1938 |
| 1,620,868 | Burger | Mar. 15, 1927 |
| 1,303,297 | Haas | May 13, 1919 |
| 891,199 | Wheeler | June 16, 1908 |
| 1,561,214 | Bush | Nov. 10, 1925 |
| 1,868,662 | Jennejohn | July 26, 1932 |
| 1,923,728 | Hoenes | Aug. 22, 1933 |
| 448,277 | Taylor | Mar. 17, 1891 |

FOREIGN PATENTS

| Number | Country | Date |
|---|---|---|
| 55,991 | Switzerland | Mar. 29, 1911 |
| 336,869 | Great Britain | Oct. 23, 1930 |